United States Patent
North et al.

(10) Patent No.: US 8,164,582 B2
(45) Date of Patent: Apr. 24, 2012

(54) METHOD AND APPARATUS FOR CALIBRATING TARGETS ON A TOUCHSCREEN

(75) Inventors: Kenneth J. North, San Carlos, CA (US); Jeffery L. Bahr, Longmont, CO (US); Joel C. Kent, Fremont, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 934 days.

(21) Appl. No.: 12/001,604

(22) Filed: Dec. 11, 2007

(65) Prior Publication Data

US 2008/0150909 A1 Jun. 26, 2008

Related U.S. Application Data

(60) Provisional application No. 60/874,207, filed on Dec. 11, 2006.

(51) Int. Cl.
*G06F 3/041* (2006.01)
(52) U.S. Cl. ........ 345/178; 345/173; 345/174; 345/175; 345/176; 345/177; 345/179; 345/180; 178/18.01; 178/18.02; 178/18.03; 178/18.04; 178/18.05; 178/18.06; 178/19.01; 178/19.02; 178/19.03
(58) Field of Classification Search .... 178/18.01–18.06, 178/19.01–19.03; 345/173–180
See application file for complete search history.

(56) References Cited

U.S. PATENT DOCUMENTS

| | | | |
|---|---|---|---|
| 5,751,276 A | 5/1998 | Shih | |
| 6,411,283 B1 | 6/2002 | Murphy | |
| 6,456,952 B1 | 9/2002 | Nathan | |
| 6,593,916 B1 | 7/2003 | Aroyan | |
| 6,650,319 B1 | 11/2003 | Hurst et al. | |
| 7,106,311 B2 * | 9/2006 | Tsang | 345/178 |
| 2003/0025680 A1 | 2/2003 | Tsang | |
| 2003/0169239 A1 | 9/2003 | Nakano et al. | |
| 2004/0061687 A1 * | 4/2004 | Kent et al. | 345/173 |
| 2006/0227116 A1 | 10/2006 | Zotov et al. | |

FOREIGN PATENT DOCUMENTS

| | | |
|---|---|---|
| EP | 0618528 A | 10/1994 |
| JP | 2005/134992 | 5/2005 |
| WO | WO-00/16188 A | 3/2000 |

OTHER PUBLICATIONS

International Search Report for International Application No. PCT/US2007/025445, mailed Apr. 4, 2008.

* cited by examiner

*Primary Examiner* — Richard Hjerpe
*Assistant Examiner* — Saifeldin Elnafia (57) ABSTRACT

A method for using a touch display system comprises defining local distortion zones within regions of a touchscreen. Each of the local distortion zones has an associated calibration touch point and a target. Coordinates of a user touch point are distorted within a first local distortion zone based on a location of the user touch point within the first local distortion zone.

13 Claims, 6 Drawing Sheets

METHOD AND APPARATUS FOR CALIBRATING TARGETS ON A TOUCHSCREEN

CROSS-REFERENCE TO RELATED APPLICATIONS

This application is an application under 35 USC 111(a) and claims priority under 35 USC 119 from Provisional Application Ser. No. 60/874,207, filed Dec. 11, 2006 under 35 USC 111(b). The disclosure of that provisional application is incorporated herein by reference.

BACKGROUND OF THE INVENTION

This invention relates generally to touch display systems, and more particularly, to algorithms for recognizing touches on touch display systems.

Touch display systems, or "touch displays", are provided for an increasing number of applications. Point of sale (POS), for processing transactions within a department store, and point of information (POI), such as an electronic directory are common. For example, applications include airport passenger and baggage check-in, and kiosks located within a store which provide information about products and services. The kiosks also may be used to place an order and/or complete a purchase without the assistance of a sales person.

A touch display system has a display for visually presenting data to a user. A touchscreen is installed in front of the display, and the user selects and/or inputs data by touching the touchscreen at locations over software programmed buttons or icons in the displayed image. There are a number of different technologies used for touchscreens, such as resistive, capacitive, infra-red and surface acoustic wave (SAW).

In order for the user's touch on the touchscreen to successfully interact with the display, the coordinates of the display and the touchscreen are calibrated with respect to each other. This is particularly important for graphical user interfaces (GUI) which tend to have buttons and icons of small size such as the small close box "X" of Microsoft's Windows®. To ensure a good linear correspondence between where a person touches the touchscreen and the resulting cursor location in the displayed image, a 25-point or 3-point calibration process may be completed to generate calibration constants before touchscreen-based GUI operation.

Touch displays often have bezels that extend over outer edges of the touchscreen, and thus areas of the touchscreen along the outer edges of the exposed touchscreen surface are often designed as dead zones. Insensitive areas proximate to the bezel prevent erroneous touches caused by bezel pressure on the touchscreen. Such bezel pressure may occur if the touch display is bumped, or simply result from static forces within the assembled touch display. However, the displayed GUI image may offer selection buttons or icons that fall close to or within the dead zones, or close to the bezel. It may be difficult or impossible for the user to select some GUI buttons due to the inactive touch zone as well as physical impedance from the bezel. This problem may be increasingly experienced as display applications become smaller in size, such as personal digital assistants and hand-held delivery tracking and signature gathering devices.

Therefore, a need exists for ensuring that touch display users can easily activate GUI buttons and icons near the outer edges of the exposed touchscreen surface. Certain embodiments of the present invention are intended to meet these needs and other objectives that will become apparent from the description and drawings set forth below.

BRIEF DESCRIPTION OF THE INVENTION

In one embodiment, a method for using a touch display system comprises defining local distortion zones within regions of a touchscreen. Each of the local distortion zones has an associated calibration touch point and a target. Coordinates of a user touch point are distorted within a first local distortion zone based on a location of the user touch point within the first local distortion zone.

In another embodiment, a touchscreen system comprises a touchscreen, a display screen and a local distortion module. The touchscreen is mounted to the display screen. The local distortion module is configured to compute a first discrepancy vector based on a first target displayed on the display screen and a first calibration touch point detected on the touchscreen. The local distortion module computes a first location distortion zone comprising the first calibration touch point. The first local distortion zone comprises a first portion of the touchscreen. The local distortion module distorts coordinates of user touch points detected within the first local distortion zone based on the first distortion vector.

In another embodiment, a method for calibrating a touch display system comprises detecting a first calibration touch point displayed on a touchscreen associated with a first target displayed on a display screen. The first calibration touch point and the first target have first and second sets of coordinates, respectively. A first local distortion zone is defined based on the first calibration touch point and comprises an area of the touchscreen including at least the first calibration touch point. A first discrepancy vector is determined for distorting coordinates of a user touch point within the first local distortion zone. The first discrepancy vector is based on the first set of coordinates and the second set of coordinates.

In another embodiment, a computer readable medium for use in a touch display system having a touchscreen comprises instructions to define local distortion zones within regions of a touchscreen. Each of the local distortion zones has an associated calibration touch point and a target. The computer readable medium also comprises instructions to distort coordinates of a user touch point within a first local distortion zone based on a location of the user touch point within the first local distortion zone.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, may reside in microprocessors of associated electronics, and the like. It should be understood that the various embodiments are not limited to the arrangements and instrumentality shown in the drawings.

Figure 1:
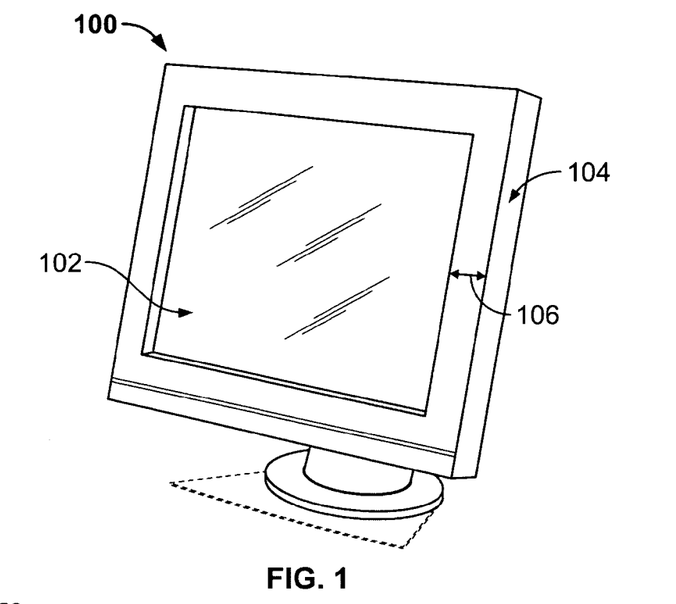
FIG. 1 illustrates a touch display in accordance with an embodiment of the present invention.

FIG. 1 illustrates a touch display 100 in accordance with an embodiment of the present invention. It should be understood that the touch display 100 may be other sizes and shapes. The touch display 100 may be installed on a desk, a wall, or within a kiosk, for example, or similar construction may used to form a hand-held device such as a personal digital assistant (PDA).

The touch display 100 comprises a touchscreen 102 and a display housing 104. The touchscreen 102 is installed over a display screen (not shown). The display housing 104 may have a bezel width 106 extending over outer edges of the touchscreen 102 and the display screen.

Figure 2:
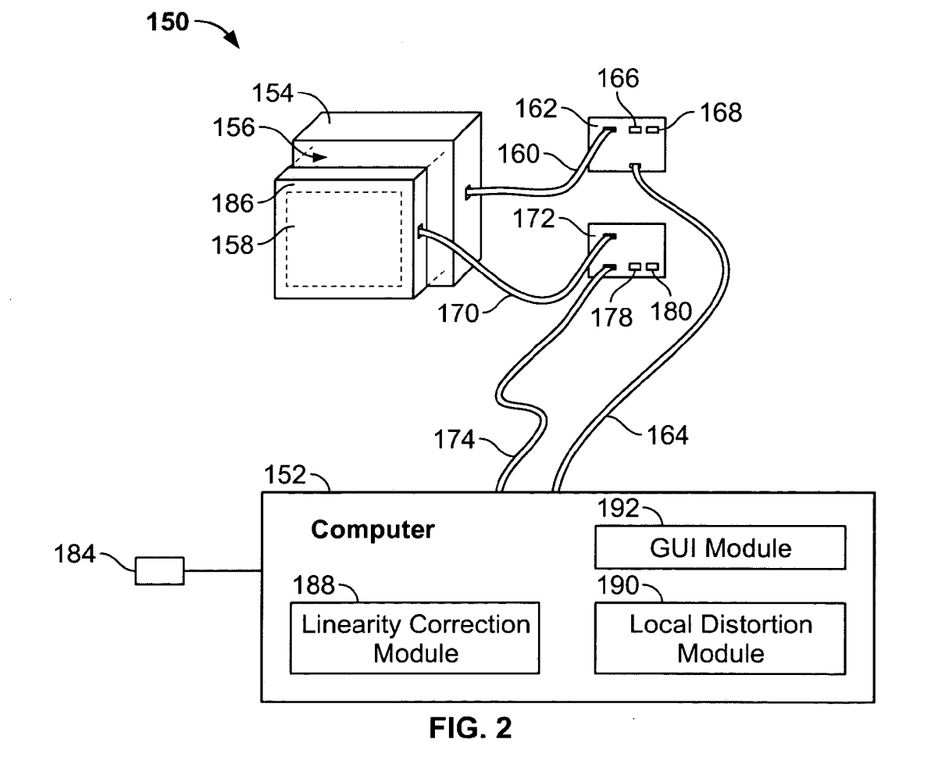
FIG. 2 illustrates a block diagram of a touch display system having a touch display interconnected with a computer in accordance with an embodiment of the present invention.

FIG. 2 illustrates a block diagram of a touch display system 150 having a touch display 154 interconnected with a computer 152. The computer 152 may run one or more applications, such as in a factory for calibration and testing, a retail store, a restaurant, a medical facility and the like. In addition to the touch display 154, the computer 152 may comprise an alternate user input 184 such as a keyboard and/or a mouse. Although indicated separately, the components of the touch display system 150 may be within a single unit, such as a PDA or other portable device.

The touch display 154 comprises components for displaying data on a display screen 156. The display screen 156 may be an LCD, CRT, Plasma, OLED display, photographic image and the like. A touchscreen 158 is installed over the display screen 156. The touchscreen 158 receives input from a user via a finger touch, a stylus, and the like.

A display cable 160 connects the touch display 154 with a display controller 162. The display controller 162 receives video information from the computer 152 over video cable 164. The video information is received and processed by the display controller 162, then transferred to the touch display 154 over the display cable 160 for display on the display screen 156. It should be understood that the touch display 154 and the display controller 162 may be hardwired together or interconnected such that the display cable 160 is not required. The display controller 162 comprises components such as a CPU 166 and a memory 168.

A touchscreen cable 170 interconnects the touchscreen 158 with a touchscreen controller 172. The touchscreen controller 172 sends and receives information to and from the computer 152 over touch data cable 174. Touch information is received by the touchscreen 158, transferred over the touchscreen cable 170 to the touchscreen controller 172, and then sent over the touch data cable 174 to the computer 152. The touchscreen controller 172 comprises components such as a CPU 178 and memory 180.

A display housing (not shown) may enclose the touch display 154, the display and touchscreen cables 160 and 170, and the display and touchscreen controllers 162 and 172. As discussed in FIG. 1, the display housing may enclose an outer edge portion of the touchscreen 158, securing the touchscreen 158 and/or covering fasteners which secure the touchscreen 158 to the display screen 156. The video and touch data cables 164 and 174 may be separate cables or packaged together. The video and touch data cables 164 and 174 may extend from the display housing to the location of the computer 152. Optionally, the display housing may be a cover for a PDA or other small hand-held or portable device which may or may not hold the computer 152 there-within. Also, the touch data cable 174 and video cable 164 may be replaced by wireless technology.

An outer edge portion or perimeter of the touchscreen 158 may be designed as a dead region 186 to avoid false touches from the bezel contact on the surface of the touchscreen 158. For example, in typical resistive touchscreens, the dead region 186 may extend slightly beyond the bezel towards the center of the touchscreen 158 to avoid false touches due to bezel contact. In SAW touchscreens, the reflector arrays may be slightly shorter than the bezel opening dimensions so that one coordinate axis is deliberately missing in regions in which acoustically partially absorbing seals are applied and might otherwise generate false touches. These perimeter dead regions 186, designed to prevent false touches, may also make it more difficult for a user to activate graphical user interface (GUI) buttons and icons located along the perimeter of the display screen 156.

"Linearity" is used to describe the ability of the touch display system 150 to discern a discrete touch event and correctly map the touch event coordinates with the actual coordinates of the underlying display image. To achieve good linearity, the touch display system 150 may be calibrated prior to touch operation of the GUI. In some cases, the hardware components within the touch display system 150 are designed with a high level of linearity so that only simple offset and scaling corrections are needed. In this case, a simple 3-point calibration procedure may be sufficient. If the hardware is less linear, a more involved 25-point calibration procedure may be used.

A linearity correction module 188 may be provided within the computer 152 for achieving good linearity with the aid of calibration constants generated by a previously executed 25-point and/or 3-point linearity calibration process. For example, in the 25-point calibration process, the user is asked to touch each calibration target within a 5×5 grid of displayed targets. The resulting touch coordinate data is used to generate appropriate calibration constants for run-time GUI use by linearity correction module 188. During run-time, the linearity correction module 188 detects the user touch points and uses any previously generated calibration constants to correlate the user touch points to cursor positions on the image displayed on the display screen 156, ensuring that the reaction of the touchscreen 158 is linear.

Conventionally, linearity is the goal of calibration. However, in the presence of perimeter dead zones, linearity contributes to problems activating perimeter GUI buttons. Therefore, in order to facilitate activation of GUI buttons located along the perimeter regions of the touchscreen 158, such as within the dead region 186 or close to the bezel, the linearity in specific locations may be deliberately distorted using a local distortion module 190. The linearity of the touchscreen 158 in other areas is not affected. The local distortion module 190 then passes coordinates of a user touch point, previously corrected for linearity and now perhaps distorted based on information within the local distortion module 190, to a GUI module 192. The Microsoft Windows® operating system is one example of a GUI module 192. The GUI module 192 determines whether the coordinates indicate a selection of a GUI button or icon. If a GUI button is selected, the computer 152 will take further action based on the functionality associated with the particular GUI button.

Although illustrated as separate modules, it should be understood that the functionality of the linearity correction module 188, local distortion module 190 and the GUI module 192 may be accomplished by a single portion of firmware or software, stored as instructions on a computer readable medium (not shown) within and/or interconnected with the computer 152. Optionally, instructions to accomplish functions of the linearity correction module 188, local distortion module 190 and the GUI module 192 may be stored within one or more modules of firmware or software.

Figure 3:
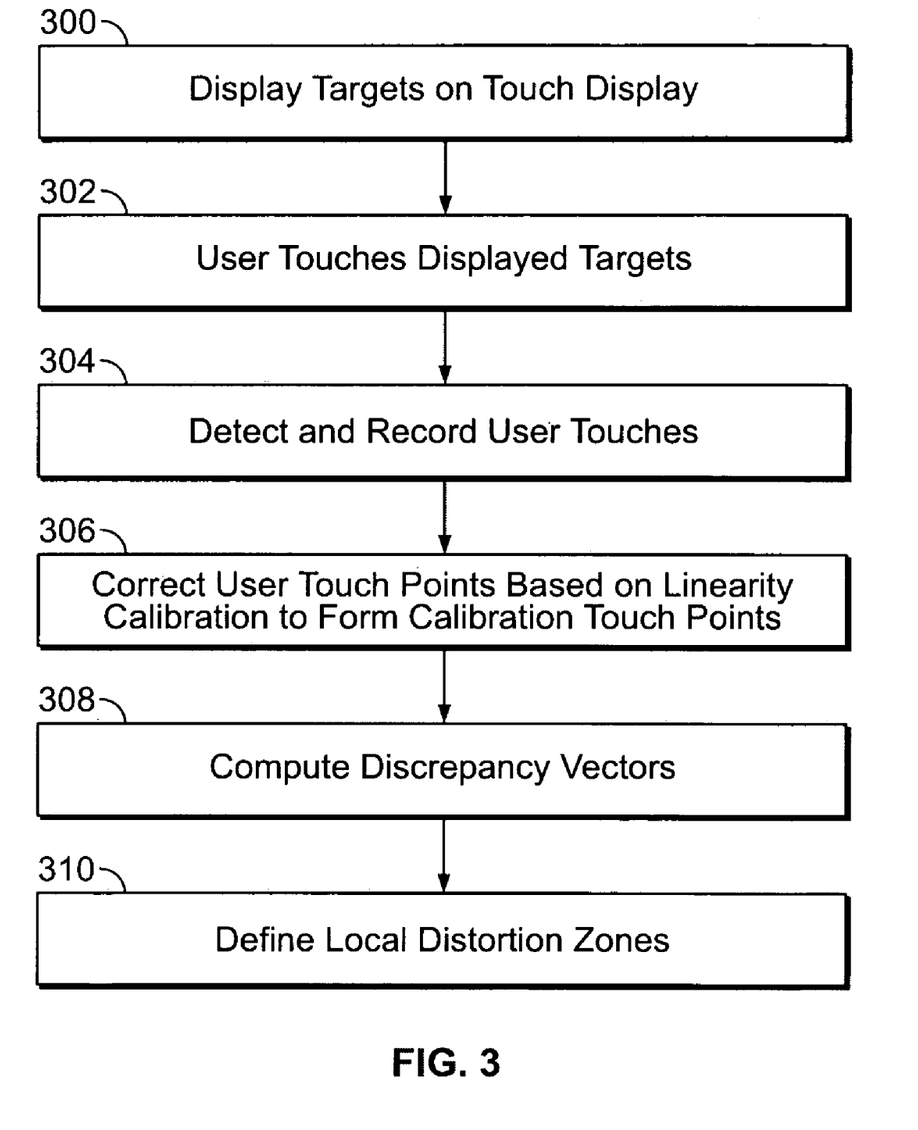
FIG. 3 illustrates a method for generating calibration constants for use by the local distortion module of FIG. 2 in accordance with an embodiment of the present invention.
Figure 4:
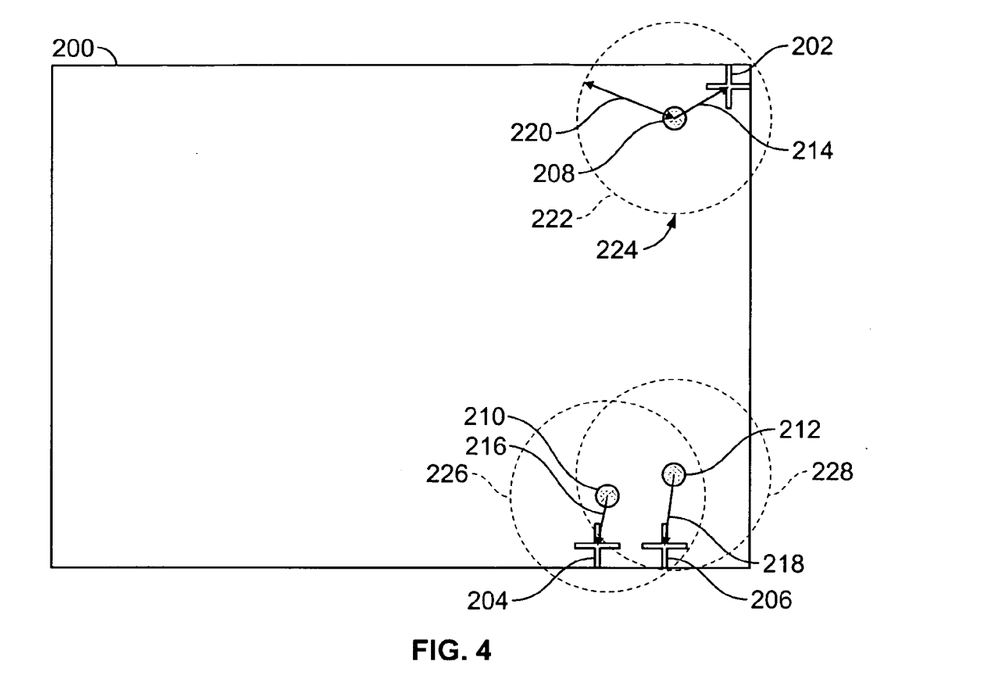
FIG. 4 illustrates examples of locally distorting linearity on a touchscreen to improve user activation of perimeter GUI buttons and icons in accordance with an embodiment of the present invention.

FIG. 3 illustrates a method for generating calibration constants for use by the local distortion module 190. GUI "targets" may be predetermined locations that correspond to GUI buttons which are likely to appear during GUI operation. Of particular interest are targets at the perimeter of the touchscreen 158 where touchscreen dead zones may be a problem. Alternatively, locations of targets may be based on actual GUI buttons available within one or more GUI application. For example, a predetermined number of GUI buttons having one or more predetermined size may be located along the bottom of the touchscreen 158, such as to indicate task bar buttons. FIG. 4 illustrates a touchscreen 200 and examples of locally distorting linearity to improve user activation of perimeter GUI buttons and icons. FIGS. 3 and 4 will be discussed together.

At 300 of FIG. 3, either one at a time, or simultaneously, graphical targets, such as cross hairs or other target-like images, are displayed at selected target locations of interest on the display screen 156. For example, first, second and third targets 202, 204 and 206 are displayed in FIG. 4. In this example, the first, second and third targets 202, 204 and 206 are located at corners and along edges of the touchscreen 200 which may be impeded by the bezel or be within the dead region 186 of the touchscreen 200. Optionally, targets may also be located at other areas of the touchscreen 200, such as to guarantee good correspondence between touchscreen and cursor coordinates at high use touch button locations.

At 302 the user touches the touchscreen 158 as close as possible to the images presented at the target locations, and at 304 the corresponding raw touchscreen coordinates are detected and recorded. If the target is in the touchscreen dead region 186, the user touches a sensitive location close to the target. At 306 the recorded raw coordinates are processed by the computer 152 based on linearity calibrations, such as by conventional scaling and correction methods, optionally including 25-point and/or 3-point calibration corrections, to form linearity corrected calibration touch points which are saved for future use by the local distortion module 190. For example, first, second and third calibration touch points 208, 210 and 212 in FIG. 4 correspond to the user's touch points of 302 which have been corrected in 306. At 308 the local distortion module 190 computes discrepancy vectors, which are based on the offset between the actual target locations and the corresponding saved coordinates from 306, as defined by Equation 1:

$$(\Delta X_n, \Delta Y_n) = (X^{true}_n - X^{25}_n, Y^{true}_n - Y^{25}_n) \qquad \text{Equation 1}$$

For example first, second and third discrepancy vectors 214, 216 and 218 (FIG. 4) are computed and saved in the local distortion module 190. At 310, for each target, the local distortion module 190 defines a local distortion zone about the coordinates saved in 306, or about the first, second and third calibration touch points 208, 210 and 212. For example, first, second and third local distortion zones 224, 226 and 228 are defined forming circles around the first, second and third calibration touch points 208, 210 and 212, respectively. For visual clarity, FIG. 4 greatly exaggerates the size of the discrepancy vectors and local distortion zones. A local distortion zone may or may not include the associated target.

By way of example, consider the specific case in 306 (FIG. 3) which includes linearization based on 25-point calibration. Prior to the method of FIG. 3, or simultaneously with 300, the computer 152 detects calibration touch events associated with a 5 by 5 grid of calibration targets (not shown), and calculates correction coefficients, if necessary, to correct for non-linearity in the hardware. Therefore, during normal operation, when the user touches the touchscreen 200, the corresponding touchscreen coordinates after the 25-point calibration are notated herein by $(X_{25}, Y_{25})$. (The subscript "25" indicates 25-point calibration.) Local distortions are added by the local distortion module 190, if necessary, to certain linearized coordinates to generate locally distorted coordinates which are then passed to the GUI module 192.

In general, during run-time a correction or distortion is made to user touch points which are detected within a predetermined range from a calibration touch point (the coordinates from 306 of FIG. 3) of an associated target. For a user touch point within a local distortion zone, the further the user touch point is from the coordinates of the associated calibration touch point, the less correction is applied to the user touch point. A user touch point located outside of all distortion zones is not distorted. User touch points within more than one distortion zone may be impacted by one or more corrections, depending upon the coordinate location of the user touch point with respect to each of the calibration touch points.

The effects of the local distortion module 190 are limited to linearly corrected touchscreen coordinates within at least one local distortion region. The local distortion module 190 accesses the true coordinates of the graphical targets displayed at 300, herein referred to as $(X^{true}_n, Y^{true}_n)$ where n=1 to N. For the example in FIG. 4, N=3 and coordinates $(X^{true}_1, Y^{true}_1)$, $(X^{true}_2, Y^{true}_2)$ and $(X^{true}_3, Y^{true}_3)$ correspond to the first, second and third targets 202, 204 and 206, respectively. The local distortion module 190 also accesses the linearly corrected coordinates of the calibration touch points generated in 306 of FIG. 3, herein referred to as $(X^{25}_n, Y^{25}_n)$. For example, coordinates $(X^{25}_1, Y^{25}_1)$, $(X^{25}_2, Y^{25}_2)$ and $(X^{25}_3, Y^{25}_3)$ correspond to the first, second, and third calibration touch points 208, 210, and 212, respectively. Furthermore, the local distortion module 190 has computed the discrepancy vectors given by Equation 1. For example $(\Delta X_1, \Delta Y_1)$, $(\Delta X_2, \Delta Y_2)$ and $(\Delta X_3, \Delta Y_3)$ correspond to the first, second and third discrepancy vectors 214, 216 and 218, respectively. Also, the local distortion module 190 determines the first, second and third local distortion zones 224, 226 and 228 as shown in FIG. 4. The local distortion module 190 combines this information from the calibration process of FIG. 3 with the run-time linearity corrected touch coordinates $(X_{25}, Y_{25})$ to compute, if appropriate, locally distorted coordinates ($X_{distorted}$, $Y_{distorted}$) that are then communicated to the GUI module 192.

Figure 5:
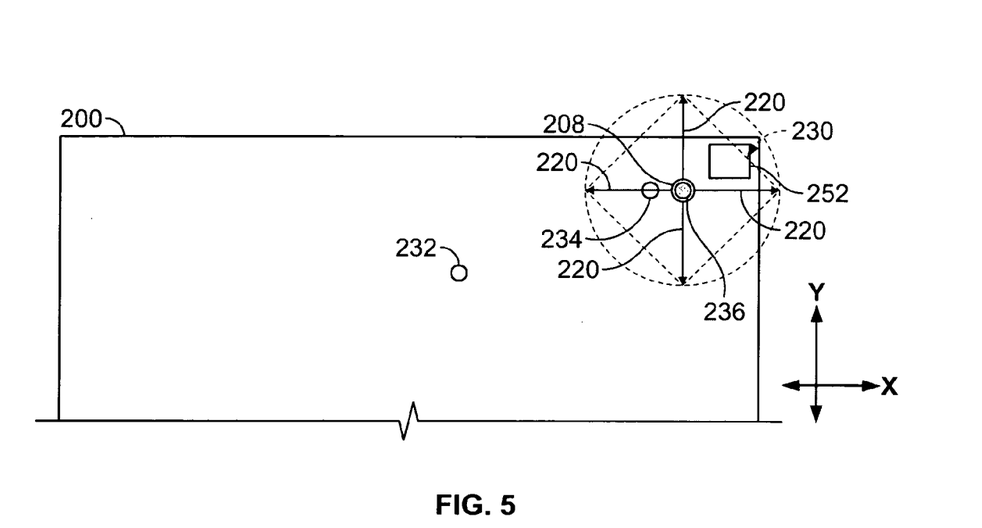
FIG. 5 illustrates a run-time first GUI button corresponding to the location of the first target of FIG. 4 in accordance with an embodiment of the present invention.

FIG. 5 illustrates a run-time first GUI button 252 corresponding to the location of the first target 202 (FIG. 4). For example, the center coordinates of the first GUI button 252, or any point within the first GUI button 252, may correspond to the first target 202. The first GUI button 252 corresponds to a portion of the touchscreen and may be activated by the selection of more than one X, Y coordinate location. If during normal GUI operation the user selects the first GUI button 252 by touching the coordinates of the first calibration touch point 208, the first discrepancy vector 214, i.e. ($\Delta X_1, \Delta Y_1$), is applied to distort the coordinates of the user touch point. This is a maximum shift, and represents the extreme case of the user touching directly on the first calibration touch point 208. The distorted coordinates correlate with the first target 202, i.e. ($X_{distorted}, Y_{distorted}$)=($X^{25}_1, Y^{25}_1$)+($\Delta X_1, \Delta Y_1$)=($X^{true}_1, Y^{true}_1$), and the GUI module 192 will activate the command corresponding to the first GUI button 252. If the GUI module 192 were to receive the coordinates corrected only for linearity of the 25-point correction ($X^{25}_1, Y^{25}_1$), the first GUI button 252 would not be selected.

As discussed previously in 310 of FIG. 3, the local distortion module 190 defines local distortion zones proximate to each of the calibration touch points 208, 210 and 212, defined in 306 of FIG. 3. Within a local distortion zone, a user touch point will be smoothly distorted in the direction of one or more targets. A distortion distance (DD) or range parameter, such as distortion distance 220 in FIG. 4, is defined. The parameter DD may be a predetermined distance defining the distance from the first calibration touch point 208 to a boundary 222 of the first local distortion zone 224. Only the one parameter DD will be discussed for simplicity; however, the second and third targets 204 and 206 also have associated second and third local distortion zones 226 and 228 with independent distortion distance DD parameter values. The DD parameters may be the same for all of the targets, or the DD parameters may be varied depending upon a location on the touchscreen 158 or run-time application. The DD parameter may also very for a single calibration touch point to define a local distortion zone having an irregular boundary.

Depending upon where the user has input the calibration touch point with respect to the target, the target may be outside of the associated local distortion zone. The local distortion zone is based on the location of the calibration touch point, and thus a user touch point may be distorted in the direction of the target. Even when a user touch is located on the calibration touch point, the maximum distortion will not distort the user touch point to the target. However, the run-time application typically associates multiple coordinates with the target, such as surrounding the target, and thus the target may be activated. Alternatively, the local distortion module 190 may reject a user input greater than a predetermined distance from a target, or may automatically adjust the size of a DD parameter to ensure activation of the associated GUI button.

A greater amount of correction or displacement is applied to a user touch point located closer to the calibration touch point 208, and a lesser amount of correction or displacement is applied to a user touch point further from the calibration touch point 208. Referring to FIG. 4, if the user touch point is on the boundary 222 or outside the first local distortion zone 224 whose size is determined by the parameter DD, the local distortion module 190 makes no correction and simply passes the coordinates of the user touch point, linearized as discussed previously, to the GUI module 192. Inside the first local distortion zone 224, the amount of displacement is smoothly and monotonically increased between the boundary 222 and the first calibration touch point 208, for example, by using a linear equation. Therefore, if the user drags their finger along the touchscreen 200 rather than selecting a single touch point, a continuous line without breaks is generated. The line may be distorted, however. As discussed previously, the first GUI button 252 may be activated by selecting a coordinate location near to the first target 202, and thus a distorted user touch point which is near to, but not directly on, the first calibration touch point 208 may still activate the first GUI button 252.

FIG. 5 also illustrates an alternative diamond-shaped local distortion zone 230 about the first calibration touch point 208. Furthermore, local distortion zones may alternatively be other shapes as well, such as an ellipse, distorted circle, square, rectangle, triangle, or any other desired shape. The shape may be determined based in part on algorithm simplicity and computation speed, for example, or may be determined based on surrounding GUI buttons and associated local distortion zones. The diamond-shaped local distortion zone 230 may be defined by four vertices formed by translating the first calibration touch point 208 a distance equal to the DD parameter in the +/−X axis and +/−Y axis directions of the touchscreen 200.

Figure 6:
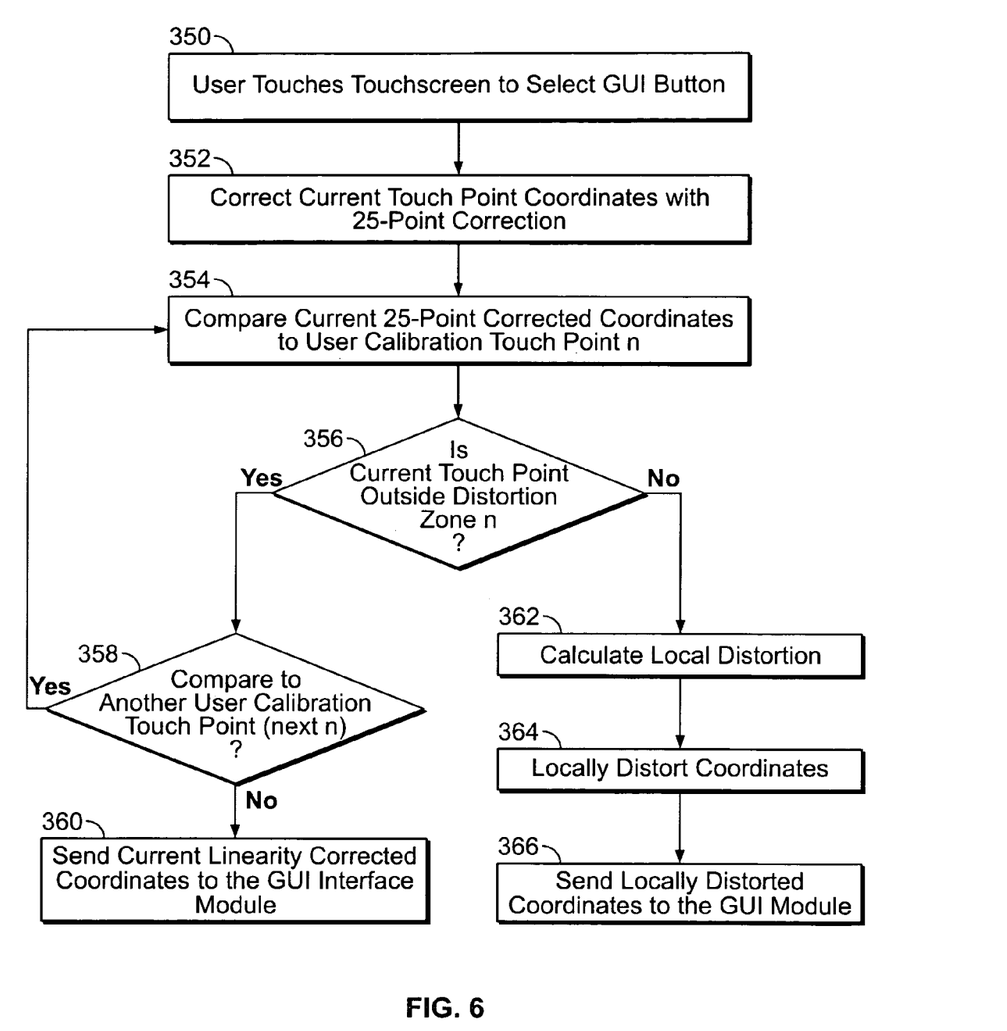
FIG. 6 illustrates a method for distorting coordinate locations of user touch points detected within a single local distortion region in accordance with an embodiment of the present invention.

FIG. 6 illustrates a method for distorting coordinate locations of user touch points detected within a single local distortion region. The case of user touch points located within overlapping areas of more than one local distortion zone is addressed later.

At 350, the user touches the touchscreen 200 (FIG. 5) to select a GUI button or other GUI representation, which generates raw touch coordinate information. In the example below, the user is attempting to activate the first GUI button 252. At 352, the linearity calibration module 188 linearly corrects and scales the raw coordinates of the current touch point based, for example, on the correction coefficients from a 25-point calibration procedure. At 354, the local distortion module 190 compares the current 25-point corrected coordinates to the calibration touch points from 306 (FIG. 3) to determine whether the current touch point is within a local distortion region.

For example, in FIG. 5, the user generates a first current touch point 232 which has 25-point corrected coordinates of ($X_{25}, Y_{25}$). Returning to FIG. 6, at 354 the local distortion module 190 compares the 25-point corrected coordinates to the first calibration touch point 208, for example, by using inequality of Equation 2 if a diamond-shaped local distortion zone 230 is desired.

$$|X^{25}_1-X_{25}|+|Y^{25}_1-Y_{25}|<DD \qquad \text{Equation 2}$$

In this case the local distortion module 190 computes the sum of the absolute values of the differences between each of the X coordinates and the Y coordinates. If the result is less than the distortion distance parameter DD associated with the first calibration touch point 208, the first current touch point 232 is within the local distortion zone 230 of the first target 202. If not, the first current touch point 232 is outside the local distortion zone 230.

At 356, if the first current touch point 232 is outside the local distortion zone 230 of the first calibration touch point 208, no local distortion correction is made, ($X_{distorted}, Y_{distorted}$)=($X_{25}, Y_{25}$), and the method passes to 358. At 358, if more calibration touch points exist, the method would return to 354. If no additional calibration touch points exist, the method passes to 360 where the local distortion module 190 sends the 25-point corrected coordinates, $(X_{distorted}, Y_{distorted})=(X_{25},Y_{25})$, to the GUI module 192.

In another example, at 350 the user generates a second current touch point 234 (FIG. 5). For simplicity, the second current touch point 234 has the same Y coordinate as the first calibration touch point 208. At 354, the local distortion module 190 uses Equation 2 to compare the 25-point corrected coordinates of the second current touch point 234 to the first calibration touch point 208. The absolute value of the Y difference in this example is zero, and thus can be ignored. The X value, however, is less than the parameter DD, the inequality of Equation 2 is satisfied, and the method passes from 356 to 362 where a local distortion is applied to the second current touch point 234.

At 362, the local distortion module 190 calculates a local distortion, for example using Equation 3 (for the case of the diamond-shaped local distortion zone 230).

$$(X_{distorted},Y_{distorted})=(X_{25},Y_{25})+\{1-[(|X^{25}{}_1-X_{25}|+|Y^{25}{}_1-Y_{25}|)/DD]\}*(\Delta X_1,\Delta Y_1) \quad \text{Equation 3}$$

The $\{1-[(|X^0{}_{25}-X_{25}|+|Y^0{}_{25}-Y_{25}|)/DD]\}$ factor of Equation 3 is a local distortion factor. The local distortion factor is multiplied times the first discrepancy vector 214 (FIG. 4) to generate a local distortion offset. In this example, the local distortion factor is a number between 1 and zero, and thus the local distortion offset is less than the total displacement of the first discrepancy vector 214 and greater than zero. As may be noted from Equation 3, a maximum local distortion offset corresponds to a local distortion factor of 1, as when $(X^{25}{}_1, Y^{25}{}_1)$ is equal to $(X_{25}, Y_{25})$.

At 364, the local distortion module 190 calculates the locally distorted coordinates with Equation 3 by adding the local distortion to the current 25-point corrected coordinates of the second current touch point 234. This locally distorts the position of the second current touch point 234 in the direction of the first target 202, and at 366, the local distortion module 190 sends the locally distorted coordinates $(X_{distorted}, Y_{distorted})$ to the GUI module 192.

In another example, if the user generates a third current touch point 236 which has the same coordinates as the first calibration touch point 208, i.e. $(X_{25},Y_{25})=(X^{25}{}_1, Y^{25}{}_1)$, at 362 the local distortion factor is equal to 1. Therefore, the entire first discrepancy vector 214 is applied to the third current touch point 236 to achieve $(X_{distorted}, Y_{distorted})=(X^{25}{}_1,Y^{25}{}_1)+(\Delta X_1,\Delta Y_1)=(X^{true}{}_1,Y^{true}{}_1)$, which corresponds to the location of the first target 202, which is then sent to the GUI module 192.

Therefore, as the current touch point moves further from the first calibration touch point 208 and nears the outer limit of the diamond-shaped local distortion zone 230, the local distortion factor and the amount of the first discrepancy vector 214 which is applied to the current touch point monotonically decreases. When the current touch point is detected on the outer limit of the local distortion zone 230, no local distortion or displacement is applied.

Figure 7:
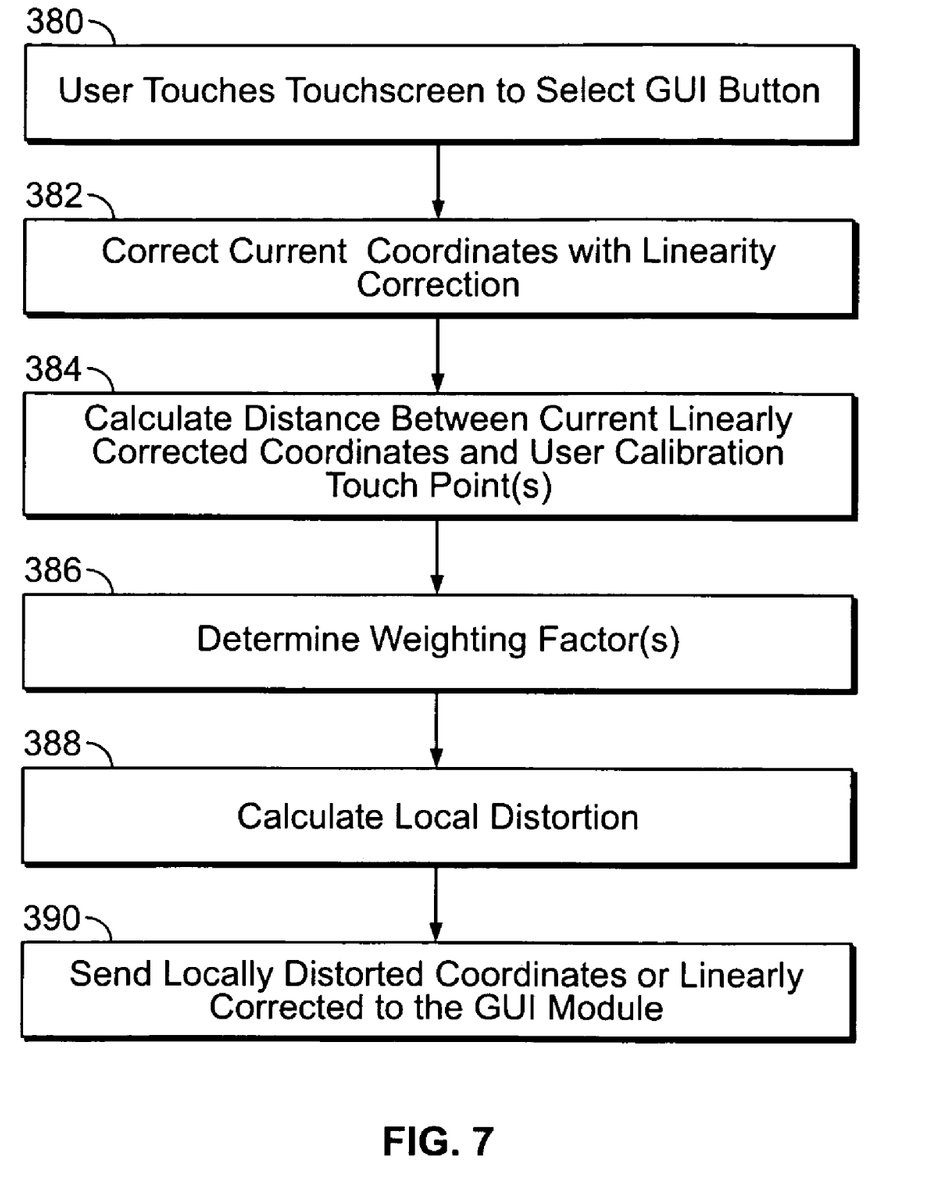
FIG. 7 illustrates a method for local distortion correction of user touch points detected anywhere on the touchscreen in accordance with an embodiment of the present invention.

FIG. 7 illustrates a method for local distortion correction of user touch points detected anywhere on the touchscreen 200. In general, no local distortion correction is applied to user touch points which are outside of all of the distortion zones. When a user touch point is detected within more than one distortion zone, the local distortion module 190 may make further calculations to determine the local distortion factor. For example, a portion of each of the appropriate discrepancy vectors may be used, or one or a portion of the total number of appropriate discrepancy vectors may be used rather than applying all of the discrepancy vectors.

Figure 8:
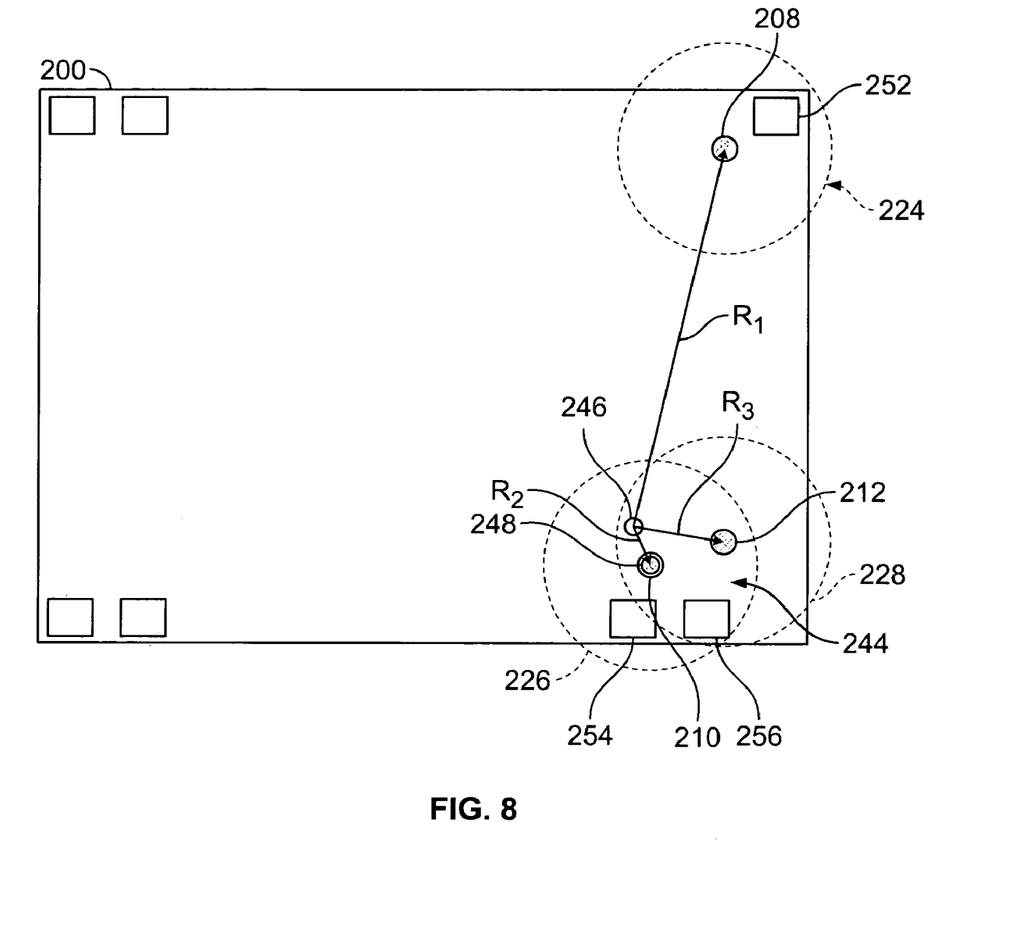
FIG. 8 illustrates the first, second and third calibration touch points and respective first, second and third local distortion zones in accordance with an embodiment of the present invention.

FIG. 8 illustrates the first, second and third calibration touch points 208, 210 and 212 and respective first, second and third local distortion zones 224, 226 and 228. Although illustrated as circles, the mathematical model may actually calculate the local distortion factor based on other shapes such as an elliptically-shaped distortion zone. As noted previously, the actual shape of the distortion zone is not limited; however, it is desirable that changes within the distortion zone are smooth and continuous and have the correct limit of zero as the user touch location approaches the distortion zone boundary from within the distortion zone.

An overlap distortion zone 244 is illustrated as the area of the touchscreen 200 which is covered by portions of both the second and third local distortion zones 226 and 228. The second and third calibration touch points 210 and 212 therefore form an isolated target group having two target members. There may be multiple isolated target groups on the touchscreen 200 having two or more target members. The number of target members may be determined by how close together the targets are to one another on the touch display 154, as well as the size of the distortion zones.

Returning to FIG. 7, at 380 the user touches the touchscreen 200 (FIG. 8) and generates a fourth current touch point 246. In this example, the user may intend to activate the second GUI button 254. At 382, the linearity correction module 188 corrects and scales coordinates of the fourth current touch point 246 based on 25-point calibration data. At 384, the local distortion module 190 calculates a distance $R_n$ between the linearly corrected fourth current touch point 246 and each of the first, second and third calibration touch points 208, 210 and 212 using Equation 4:

$$R_n=\sqrt{\{(X_{25}-X^{25}{}_n)^2+(Y_{25}-Y^{25}{}_n)^2\}} \quad \text{Equation 4}$$

For example, $R_1$, $R_2$ and $R_3$ correspond to distances from the fourth current touch point 246 and the first, second and third calibration touch points 208, 210 and 212, respectively.

Equation 4 is inspired by Pythagoras's theorem, which mathematically gives a true distance when applied to Cartesian coordinates in which X and Y coordinates are scaled consistently. However, Equation 4 remains a useful option for local distortion module 190 even when both X and Y coordinates are scaled to the same range, e.g. $\pm\frac{1}{2}$ scale for both X and Y, despite the fact that the touch display 154 will typically not be square but rather have a 3:4 aspect ratio. Such inconsistencies between X and Y scales causes first, second and third local distortion zones 224, 226 and 228 to become elliptically shaped rather than circular, but still leads to local distortions that are smoothly varying functions with the right limiting behaviors as desired.

At 386, the local distortion module 190 determines a weighting factor to be applied to each of the first, second and third discrepancy vectors 214, 216 and 218. When a user touch point is near or on an isolated target, such as the first target 202 which forms no overlap distortion zone with any other target, Equation 5 may be used to determine the weighting factor:

$$w_n=\text{Max}(0,1-R_n/DD) \quad \text{Equation 5}$$

Returning to the case illustrated in FIG. 5 where the user touches a calibration touch point n, such as the third current touch point 236 (FIG. 5), the distance $R_n$ from the target n is zero. In Equation 5, $R_n/DD$ becomes zero, $1-0=1$, and the maximum of zero and 1 is 1, resulting in a weighting factor $w_n=1$. Also, if $R_n=DD$, then $w_n=0$, so when the current touch point is on the boundary of the first local distortion zone 224, no local distortion is made. If the current touch point is outside of the first local distortion zone 224, a negative result for the expression $1-R_n/DD$ gives $w_n=0$. For a single isolated target, the weighting function $w_n$ is used with Equation 6 by the local distortion module 190 to compute possibly distorted coordinates $(X_{distorted}, Y_{distorted})$. Note that Equation 3 is the special case of Equation 6 for n=1 and the alternate weighting function $w_n = \text{Max}(0, 1-[(|X^{25}_n-X_{25}|+|Y^{25}_n-Y_{25}|)/DD]\})$.

$$(X_{distorted}, Y_{distorted}) = (X_{25}, Y_{25}) + w_n*(\Delta X_n, \Delta Y_n) \quad \text{Equation 6}$$

If the local distortion module 190 determines that at most a single weighting factor $w_n$ is non-zero, then the local distortion calculation at 388 may be based on Equation 6. Note that this includes the special case when the user touch point is outside of all local distortion zones, and hence all weighting factors $w_n$ are zero, $(X_{distorted}, Y_{distorted})$ equals $(X_{25}, Y_{25})$ and hence no local distortion is made. On the other hand, if the local distortion module 190 determines that more than one weighting factor is non-zero, the user touch point is in the overlap of more than one distortion zone, and the weighting factor calculation at 386 becomes more involved as discussed below.

Referring again to FIG. 8, consider the case that the user generates the fourth current touch point 246 when attempting to activate the second GUI button 254. The fourth current touch point 246 falls within the overlap distortion zone 244 of the second and third local distortion zones 226 and 228, and thus a non-zero weighting function is calculated for both of the second and third discrepancy vectors 216 and 218 (FIG. 4) when using the Equation 5. Unfortunately, applying Equation 6 (with an implied sum over all n with non-zero weighting functions) may result in distorting the fourth current touch point 246 based on both the second and third calibration touch points 210 and 212 and the second GUI button 254 might not be activated because of undesired distortions associated with the neighboring third target 206. To address this problem, the weighting factors $w_n$, such as defined in Equation 5, are regarded as intermediate results in the more sophisticated weighting factor calculation presented below.

In addition to the distance $R_n$ between the run-time user touch point and calibration touch point n of Equation 4, the distances between each pair of calibration points n and m may be computed as given in Equation 7.

$$R_{n,m} = \sqrt{\{(X^{25}_m - X^{25}_n)^2 + (Y^{25}_m - Y^{25}_n)^2\}} \quad \text{Equation 7}$$

For example $R_{1,2}=R_{2,1}$ indicates a measure of distance between the first and second calibration touch points 208 and 210, $R_{1,3}=R_{3,1}$ is a measure of distance between the first and third calibration touch points 208 and 212, and $R_{2,3}=R_{3,2}$ is a measure of distance between the second and third calibration touch points 210 and 212. Note that when a user touches calibration touch point m, then $R_n$ of Equation 4 equals $R_{n,m}$ of Equation 7.

As further preparation of a more sophisticated weighting factor for use with overlapping zones of distortion, it is useful to evaluate the isolated target weighting function $w_n$ for the special case of a touch at calibration touch point m. This quantity may be represented as and computed as given in Equation 8. For example, the isolated weighting function $W_3$ for the third target 206 when the user touch point is exactly on the second calibration touch point 210 is $w_{3,2}$. (Because $R_{n,m}=R_{m,n}$, then $w_{n,m}=w_{m,n}$.)

$$w_{n,m} = \text{Max}(0, 1-R_{n,m}/DD) \quad \text{Equation 8}$$

With the aid of Equations 7 and 8, more sophisticated weighting factors may be computed in 386 and the local distortion calculation at 388 may be based on Equation 10.

$$W_n = w_n * \prod_{all\ m \neq n} \{(1-w_m)/(1-w_{n,m})\} \quad \text{Equation 9}$$

$$(X_{distorted}, Y_{distorted}) = (X_{25}, Y_{25}) + \sum_{n=1}^{N} W_n * (\Delta X_n, \Delta Y_n) \quad \text{Equation 10}$$

Now consider the case of a user touch point near an isolated target n and the user touch point is outside the local distortion zone for all other targets m. In this case $w_m=0$ and $w_{n,m}=0$ and all factors in the product of Equation 9 are one, and hence $W_n=w_n$ and $W_m=0$ for all other targets m. In this case, Equation 10 reduces to Equation 6. One can also show that for user touch points outside of all target distortion zones, Equations 9 and 10 result in no distortion, i.e. $(X_{distorted}, Y_{distorted})=(X_{25}, Y_{25})$. Below, the case is considered wherein a user touch point is within the overlap between two or more local distortion zones.

Referring to FIG. 8, consider again the fourth current touch point 246 which is in the local distortion zones of both the second and third targets 204 and 206. In this case, the weighting factor $W_1$ is zero while both weighting factors $W_2$ and $W_3$ are non-zero, and the calculated local distortion at 388 via Equation 10 will include partial offsets from both of the second and third discrepancy vectors 216 and 218 (FIG. 4). Because of the nature of Equations 9 and 10, the distorted coordinates will vary in a smooth continuous fashion as the location of the user touch point varies, with the goal for the distorted coordinates to land on the target when the user touch point lands on the corresponding calibration point in the overlap case as shown below.

In another example, the user may attempt to activate the second GUI button 254 and generates fifth current touch point 248, which corresponds to the second calibration touch point 210. After linearity corrections at 382, the fifth current touch point 248 has coordinates $(X_{25}, Y_{25})=(X^{25}_2, Y^{25}_2)$. In this case, the non-zero weighting factors $w_n$ are $w_2=1$ as well as $w_3=w_{3,2}=w_{2,3} \neq 0$. Keeping in mind that the product of Equation 9 excludes the case m=n, $W_2=1$ and $W_3=0$ as follows.

$$W_2=w_2*\{(1-w_3)/(1-w_{2,3})\}=w_2*\{(1-w_{2,3})/(1-w_{2,3})\}=w_2=1; \text{ and}$$

$$W_3=w_3*\{(1-w_2)/(1-w_{3,2})\}=w_3*\{(1-1)/(1-w_{3,2})\}=0.$$

Thus, when the user touches the second calibration touch point 210, only the n=2 term in the sum in Equation 10 is non-zero and Equation 10 reduces to $(X_{distorted}, Y_{distorted})=(X^{25}_2, Y^{25}_2)+(\Delta X_2, \Delta Y_2)=(X^{true}_2, Y^{true}_2)$ as desired. More generally, when a user touches a calibration touch point k, $w_k=1$ and $W_k=1$, while for all other calibration touch points $n \neq k$ result in a factor $(1-w_k)=0$ in the product of Equation 9 and hence $W_n=0$. Therefore, the distortion applied by Equation 10 for a touch at the calibration touch point k is the discrepancy vector $(\Delta X_k, \Delta Y_k)$ with no contributions from any other discrepancy vector so that $(X_{distorted}, Y_{distorted})=(X^{25}_k, Y^{25}_k)+(\Delta X_k, \Delta Y_k)=(X^{true}_k, Y^{true}_k)$ as desired. Equations 9 and 10 provide an explicit example of a mathematical algorithm that can handle the case of overlapping distortion zones and at the same time assure that user touch points corresponding to calibration points are mapped to the desired target locations. Returning to FIG. 7, the result of such local distortion calculations at 388 are then passed on the GUI module 192 at 390.

While the invention has been described in terms of various specific embodiments, those skilled in the art will recognize that the invention can be practiced with modification within the spirit and scope of the claims.

What is claimed is:

1. A method for using a touch display system, comprising:
defining local distortion zones within regions of a touchscreen, each of the local distortion zones having an associated calibration touch point and associated distortion distance therefrom and an associated target, wherein the associated calibration touch point comprises linearity corrected coordinates;
determining a first discrepancy vector between a first calibration touch point and a first target associated with a first local distortion zone;
computing a weighting factor based on a location of a user touch point within the first local distortion zone;
computing an amount of the first discrepancy vector based on the weighting factor, the amount being a local distortion offset; and
distorting linearity corrected coordinates of the user touch point within a first local distortion zone based on the location of the user touch point within the first local distortion zone, the amount being applied to distort the linearity corrected coordinates of the user touch point; wherein the local distortion offset is monotonically decreased for linearity corrected coordinates of user touch points that are further away from the first calibration touch point.

2. The method of claim 1, wherein the local distortion zones comprise one of a circle, an ellipse, a diamond shape, square, rectangle, triangle.

3. The method of claim 1, further comprising:
determining an overlap distortion zone comprising coordinates of the touchscreen which are within the first local distortion zone and a second local distortion zone; and
distorting coordinates of a second user touch point within the overlap distortion zone based on a location of the second user touch point with respect to first and second calibration touch points that are associated with first and second local distortion zones, respectively.

4. The method of claim 1, wherein
the weighting factor $w_n$ is a maximum of $(0, 1-R_n/DD)$ where n=1, DD is a first distortion distance of the first local distortion zone and $R_n$ is a distance of the user touch point from the first calibration touch point.

5. The method of claim 1, the first discrepancy vector representing a maximum local distortion offset that may be applied to the user touch point.

6. The method of claim 1, further comprising:
defining an overlap distortion zone comprising overlapping portions of first and second local distortion zones associated with first and second calibration touch points, respectively;
determining a first displacement between a second user touch point within the overlap distortion zone and the first calibration touch point and a second displacement between the second user touch point and the second calibration touch point; and
minimizing the local distortion offset associated with the second calibration touch point when the second user touch point is closer to the first calibration touch point.

7. A touchscreen system comprising:
a display screen;
a touchscreen being mounted to the display screen; and
a local distortion module being configured to:
compute a first discrepancy vector based on a first target displayed on the display screen and a first calibration touch point detected on the touchscreen, the first calibration touch point comprising linearity corrected coordinates;
compute a first local distortion zone having the first calibration touch point, the first local distortion zone comprising a first portion of the touchscreen;
compute a weighting factor based on a location of a user touch point within the first local distortion zone;
compute an amount of the first discrepancy vector based on the weighting factor, the amount being a local distortion offset; and
distort linearity corrected coordinates of the user touch point detected within the first local distortion zone based on the first distortion vector; wherein the local distortion offset is monotonically decreased for linearity corrected coordinates of user touch points that are further away from the first calibration touch point.

8. The system of claim 7, the local distortion module further configured to distort the coordinates of a first user touch point within the first local distortion zone by a portion of the first distortion vector, the portion being based on a proximity of the first user touch point to a first calibration touch point.

9. The system of claim 7, the local distortion module further configured to:
compute the weighting factor based on a displacement from the user touch point to the first calibration touch point; and
compute locally distorted coordinates for the user touch point based at least on the weighting factor.

10. The system of claim 9, wherein the weighting factor $w_n$ is a maximum of $(0, 1-R_n/DD)$ where n=1, DD is a first distortion distance of the first local distortion zone and $R_n$ is a distance of the user touch point from the first calibration touch point.

11. The system of claim 7, the local distortion module further configured to:
compute a second discrepancy vector based on a second calibration touch point and a second target;
compute a second local distortion zone having the second calibration touch point, the first and second local distortion zones forming an overlap zone of common touchscreen coordinates; and
apply the weighting factor to each of the first and second discrepancy vectors when a second user touch point is within the overlap zone.

12. The system of claim 11, the local distortion module configured to determine a first displacement between the second user touch point and the first calibration touch point and a second displacement between the second user touch point and the second calibration touch point; and
to minimize the local distortion offset associated with the second calibration touch point when the second user touch point is closer to the first calibration touch point.

13. The system of claim 7, the local distortion module wherein the weighting factor scales the first discrepancy vector of the first target based on at least a first discrepancy from the first calibration touch point, the weighting factor being zero when the user touch point is outside the first local distortion zone.

* * * * *